A. & P. STAFFER.
Flour Cooler.

No. 91,381.

Patented June 15, 1869.

Witnesses

Inventors.
A. Staffer.
P. Staffer.
per
Attorneys

United States Patent Office.

ABRAHAM STAFFER AND PETER STAFFER, OF SALT CREEK, INDIANA.

Letters Patent No. 91,381, dated June 15, 1869.

IMPROVED FLOUR-COOLER.

The Schedule referred to in these Letters Patent and making part of the same.

*To all whom it may concern:*

Be it known that we, ABRAHAM STAFFER and PETER STAFFER, of Salt Creek, in the county of Porter, and State of Indiana, have invented a new and useful Improvement in Flour-Cooler; and we do hereby declare that the following is a full, clear, and exact description thereof, which will enable those skilled in the art to make and use the same, reference being had to the accompanying drawings, forming part of this specification.

This invention relates to an improvement in machines for cooling flour in the process of manufacturing the same, whereby the operation is more thoroughly and speedily performed than by the old method.

The invention consists in arranging a series of revolving arms on different floors or platforms, whereby the flour is moved to and from the centre on the different floors, and manipulated in such a manner that the cooling is completed very expeditiously.

Similar letters of reference indicate corresponding parts.

Figure 1:
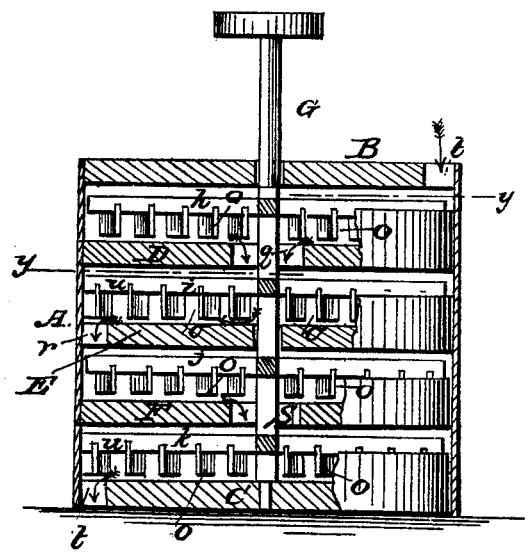
Figure 1 represents a vertical section of the cooler through the line $x\ x$ of fig. 2.
Figure 2:
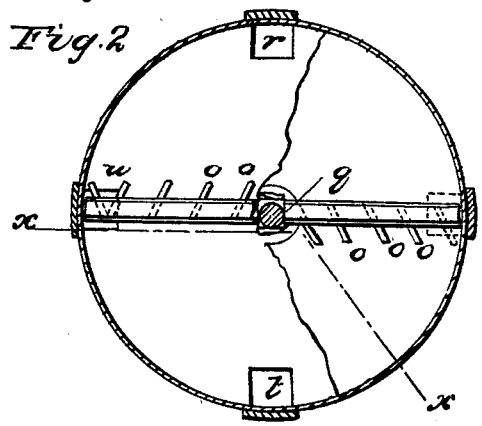
Figure 2 is a horizontal section of fig. 1, through the line $y\ y$.

This cooler consists of a cylindrical casing, A, with an upper and a lower head, B C, of any desired size and proportions.

D, E, and F, represent stationary floors with suitable apertures through them, for the passage of the flour.

G is a central vertical shaft, which revolves in the heads C B, which shaft is provided with a transverse arm for each floor, and one also for the bottom head C.

The length of these arms corresponds with the diameter of the casing A, having play sufficient to allow them to freely revolve therein. They are marked, respectively, $h$, $i$, $j$, and $k$.

On the under side of each of these arms, conveyer-wings $o$ are arranged, as seen in the drawing.

The flour is admitted through the aperture $p$ in the top head, as indicated by the arrow, and falls on the floor D.

The wings $o$, on the arm $h$, are arranged so as to move or carry the flour to the central aperture $q$, through which it drops on to the floor E.

On this floor the flour is moved, by the wings $o$, on the arm $i$ from the centre to the outside, so that it drops on to the floor F below, through one or more apertures $r$.

On the floor F the flour is again moved from the outside, where it has fallen, to the central aperture S, through which it drops on to the bottom head C, where it is moved, by the wings on the arm $k$, to the outside again, and is discharged from the cooler through one or more apertures $t$, as seen in the drawing, and indicated by the arrow.

On the outer end of each of the arms which move the flour toward the centre, there is a V-shaped conveyer, for more readily discharging the flour, as seen at $u\ u$.

It will thus be seen that the flour is kept in constant motion, and is made to travel over a large space in passing through the cooler.

The flour is thus rapidly cooled by being passed from one floor to another, and moved alternately back and over the floors.

By this arrangement, the cooling of the flour for a large mill is confined to a space very small when compared with the room or apartment usually devoted to that purpose.

We claim as new, and desire to secure by Letters Patent—

The arrangement of the floors D E F, having openings alternately at the centre and periphery, and the arms $h\ i\ j\ k$, having the wings $o$ inclined in opposite directions alternately, the arms $i\ k$ having end wings $u$, all operating as described, to discharge the flour from one floor to another through the openings $q\ r\ s\ t$, for the purpose specified.

The above specification of our invention signed by us, this 5th day of October, 1868.

A. STAFFER.
P. STAFFER.

Witnesses:
J. R. MILLAR,
I. N. BEESON.